United States Patent
Parker

(10) Patent No.: US 6,468,929 B2
(45) Date of Patent: Oct. 22, 2002

(54) FABRIC COATING COMPOSITIONS PROVIDING EXCELLENT RESISTANCE TO SEAM COMBING, PARTICULARLY FOR USE ON AUTOMOTIVE AIRBAG FABRICS

(75) Inventor: Richard Henry Parker, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/891,927

(22) Filed: Jun. 26, 2001

(65) Prior Publication Data

US 2002/0111097 A1 Aug. 15, 2002

Related U.S. Application Data

(62) Division of application No. 09/335,202, filed on Jun. 17, 1999, now Pat. No. 6,348,543.

(51) Int. Cl.$^7$ ................................................. B32B 27/00
(52) U.S. Cl. ........................... 442/164; 528/12; 528/24; 525/479; 525/55; 525/106; 442/104; 280/728.1; 427/384; 428/447; 106/287.1
(58) Field of Search .......................... 525/479, 55, 106; 528/12, 32; 442/104, 164; 280/728.1; 427/387; 428/447; 106/287.1

(56) References Cited

U.S. PATENT DOCUMENTS

| | | | |
|---|---|---|---|
| 3,705,645 A | 12/1972 | Konen | 206/46 |
| 4,217,256 A | 8/1980 | Peerman et al. | 260/18 |
| 4,362,833 A * | 12/1982 | Mune et al. | |
| 4,536,553 A * | 8/1985 | Rufer et al. | |
| 4,921,735 A | 5/1990 | Bloch | 428/34.9 |
| 4,994,225 A | 2/1991 | Davis | 264/257 |
| 5,073,418 A | 12/1991 | Thornton et al. | 428/34.9 |
| 5,110,666 A | 5/1992 | Menzel et al. | 428/196 |
| 5,208,097 A | 5/1993 | Honma et al. | 428/226 |
| 5,399,402 A | 3/1995 | Inoue et al. | 428/35.7 |
| 5,421,378 A | 6/1995 | Bowers et al. | 139/435.1 |
| 5,503,197 A | 4/1996 | Bowers et al. | 139/435.1 |
| 5,529,837 A | 6/1996 | Fujiki et al. | 428/266 |

* cited by examiner

*Primary Examiner*—Robert Dawson
*Assistant Examiner*—Kuo Liang Peng
(74) *Attorney, Agent, or Firm*—Terry T. Moyer; William S. Parks

(57) ABSTRACT

This invention relates to a new adhesive coating composition, particularly for use on airbag fabrics, which is composed of a crosslinked blend of a polyalkyl- or polyphenylsiloxane with vinyl functionality and a copolymer of ethylene and methyl acrylate. This coating provides excellent adhesive properties to the coated fabric, in that it restricts the movement, when put under stress, of the yarns constructing that fabric, which are situated adjacent to seams in the fabric. This reduces the effect known in the trade as combing. Fabric treated with this material in the manner described herein, requires a marked increase in the amount of force required for this yarn movement. This distortion of the fabric can be detrimental in an automotive airbag, in that, it may result in the loss of inflating air, and under extreme conditions may result in a seam failure.

18 Claims, No Drawings

FABRIC COATING COMPOSITIONS PROVIDING EXCELLENT RESISTANCE TO SEAM COMBING, PARTICULARLY FOR USE ON AUTOMOTIVE AIRBAG FABRICS

CROSS REFERENCE TO RELATED APPLICATIONS

This application is a divisional of application Ser. No. 09/335,202, filed on Jun. 17, 1999 now U.S. Pat. No. 6,348,543. This parent application is herein entirely incorporated by reference.

FIELD OF THE INVENTION

This invention relates to a new adhesive coating composition, particularly for use on airbag fabrics, which is composed of a crosslinked blend of a polyalkyl- or polyphenylsiloxane with vinyl functionality and a copolymer of ethylene and methyl acrylate. This coating provides excellent adhesive properties to the coated fabric, in that it restricts the movement, when put under stress, of the yarns constructing that fabric, which are situated adjacent to seams in the fabric. This reduces the effect known in the trade as combing. Fabric treated with this material in the manner described herein, requires a marked increase in the amount of force required for this yarn movement. This distortion of the fabric can be detrimental in an automotive airbag, in that, it may result in the loss of inflating air, and under extreme conditions may result in a seam failure.

BACKGROUND OF THE PRIOR ART

Airbags for motor vehicles are known and have been used for a substantial period of time. These devices are installed on the driver and passenger side of automobiles and, in the event of a collision, are rapidly inflated with gas, to act as a barrier between the driver or passenger and the steering wheel or dashboard of the automobile.

Coatings have been applied to fabrics, intended for use in automotive airbags, to resist the unwanted permeation of air through the fabric and, to a lesser extent, to protect the fabric from detriment by the hot gases used to inflate the bags. Polychloroprene was the polymer of choice in the early development of this product, but the desire to decrease the folded size of the completed airbag, and the tendency of polychloroprene to degrade, with exposure to heat, to release the components of hydrochloric acid (thereby potentially degrading the fabric component as well as releasing hazardous chemicals), has led to the almost universal acceptance of silicone (polydimethylsiloxane or similar materials) as a more suitable coating. In the quest for the most compact folded size possible, coating levels of polymer have dropped from around 2.5 ounces per square yard of fabric, to levels approaching 0.5 ounces per square yard.

New developments in airbags, particularly newer designs being placed in the sides of the passenger compartment, have introduced the requirement that the bags hold pressure longer under use. This, and the evolution of the lower coating levels of silicone polymer, have begun to highlight the effect that, when a sewn seam is put under stress, a naturally lubricating silicone coating may allow the yarns from which the fabric is constructed to shift. This shifting can lead to leakage of the inflating gas through the new pores formed from the shifting yarns, or, in drastic cases, cause the seam to fail. Since the airbag must retain its integrity during a collision event, in order to sufficiently protect the driver or passenger, there is a great need to provide coatings which provide both effective permeability characteristics and sufficient restriction of yarn shifting for the airbag to function properly, if and when necessary. Therefore, a need exists for a cost-effective, one-layer coating which provides low permeability, resistance to yarn shifting and age resistance over long periods of storage.

OBJECTS OF THE INVENTION

It is therefore an object of the invention to provide an adhesive coating composition for fabric substrates, which provides substantial reduction of the tendency of yarns, located at cut edges or seams in the fabric, to shift when put under stress. It is a further object of the invention, to provide a highly cost-effective, easily handled and simple-to-make formulation for use as an adhesive coating on fabric surfaces. Yet another object of the invention is to provide a highly effective coating for airbag fabrics, bags and cushions, which substantially reduces the chances of an airbag failure due to bursting or torn seams, during inflation initiated by a collision event.

DESCRIPTION OF THE INVENTION

The inventive coating (which may be utilized on any fabric substrate) provides such an improvement. This coating is comprised of a polysiloxane polymer with vinyl functionality, blended with an ethylene-containing copolymer (in combination with a substituent which has a polar nature) the entire system being cured with an agent capable of crosslinking both of these polymers. More specifically, the inventive material is comprised of a polyalkyl- or polyphenylsiloxane, blended with a copolymer of ethylene and, as one non-limiting preferred substituent, methyl acrylate or a copolymer of ethylene and, as another non-limiting preferred substituent, vinyl acetate, and cured with a peroxide. It has been found that the ethylene-methyl acrylate copolymer provides the most desired adhesive qualities upon incorporation with the vinyl-containing polysiloxane, while retaining the other required properties for an airbag fabric.

Preferably, the coating is produced by combining, in solution, 50–95 parts of the polysiloxane polymer, 5–50 parts of the ethylene-containing copolymer and 2–10 parts of an organic peroxide curing agent. The siloxane component may be comprised of a polyalkylsiloxane, a polyarylsiloxane or a copolymer of both, each containing at least one vinyl functionality to allow appropriate crosslinking. Specifically, the preferred polyalkylsiloxane is a vinyl-containing polydimethylsiloxane and the preferred polyarylsiloxane is a vinyl-containing polyphenylsiloxane, either of these materials may contain nondisclosed materials common to the compounding of commercial materials of this sort. The ethylene-containing copolymer may be a copolymer comprised of 60–85 weight percent ethylene and 15–40 weight percent methyl acrylate, preferably from 65–75 weight percent ethylene and 25–35 weight percent methyl acrylate, and most preferably a distribution of about 66–67 to about 33–34 of the two components. It may also be an ethylene containing copolymer comprised of 20–60 weight percent ethylene and 40–80 weight percent vinyl acetate, preferably from about 25–50 weight percent ethylene and from about 50–75 weight percent vinyl acetate, and most preferably about 40 and about 60 weight percent of these two components. The preferred curing agent is an acyl peroxide, typically, but not limited to, benzoyl peroxide. Other well known curing agents may also used be used either supplemental to or as a substitute for the preferred peroxide. Also, a solvent is preferably present to effectuate proper and thorough mixing of the components of the preferred coating composition. More preferably such solvent is organic and volatile (i.e., evaporates easily at a relatively low temperature); most preferably such a solvent is toluene or similar type volatile liquid.

The coating may contain silane coupling agents of the type well known to the trade for improving the adhesion of silicone containing coatings to fabrics (such as trimethoxysilanes, as merely a broad example). It may also contain pigments or colorants, (for identification or aesthetic reasons); inert ingredients (such as calcium carbonate or other materials classified as fillers), to reduce cost without also reducing the desired performance of the inventive coating as applied to the target fabric; flame retardants; and processing aids necessary to process the composition and make it suitable for use as an airbag coating.

This inventive coating composition may be applied to any type of fabric substrate to alleviate seam tears and unraveling at cut edges. Thus any type of fabric may be utilized in conjunction with the inventive coating, including those comprising natural fibers, such as cotton, ramie, abaca, wool and the like; synthetic fibers, such as polyester, polyamide, regenerated cellulose and the like; and inorganic fibers, such as glass, boron derivative fibers and the like. Furthermore, the target fabrics may be woven, knitted, non-woven and the like. Preferably, the target fabric substrate comprises synthetic fibers, preferably, polyesters and polyamides and is preferably an airbag fabric.

If an airbag fabric is desired, any standard low permeability airbag fabric construction may be utilized as the target airbag fabric with the inventive composition. Preferably, however the target airbag fabric within this invention is a plain woven fabric, formed from yarns comprising polyamide or polyester fibers. Such yarn preferably has a linear density of about 210 denier to about 630 denier. Such yarns are preferably formed from multiple filaments, wherein the filaments have linear densities of about 6 denier per filament or less and most preferably about 4 denier per filament or less. Such substrate fabrics are preferably woven using fluid jet weaving machines as disclosed in U.S. Pat. Nos. 5,503,197 and 5,421,378 to Bower et. al. (incorporated herein by reference). The fabric substrate with applied coating will hereinafter be referred to as an airbag base fabric.

In accordance with the potentially preferred practices of the present invention, a toluene dispersion comprised of from 20–30 percent non-volatile materials, is constructed from the materials described above. The potentially preferred dispersion comprises 65 phr of the vinyl functional polysiloxane, available under the tradename SilasticÔ HS-30 silicone rubber from Dow Corning (which is believed to have a place of business at Midland, Mich.), 35 phr of the ethylene-methyl acrylate copolymer, available under the tradename Vamac DÔ from DuPont Polymers (which is believed to have a place of business at Wilmington, Del.), 5 phr of benzoyl peroxide and 1 phr of 3-methacryloxypropyltrimethoxysilane available under the tradename Silane Z-6030Ô from Dow Corning.

Once compounding is complete, the formulation is preferably scrape coated across the airbag base fabric, the solvent (toluene, for example) is subsequently removed by evaporation by placing the treated airbag base fabric in an oven at 60–90° C., and the resultant coated airbag base fabric is then cured in an oven at 150–200° C. to form a thin coating. Scrape coating, in this sense includes, and is not limited to, knife coating, in particular, knife over roll, knife over gap, knife over table, floating knife and knife over foam pad methods, to name a few method types. Since the coating composition exhibits excellent adhesive properties, generally only one coating pass is necessary to provide an effective, stable, low permeability coating on the target fabric surface.

The final dry weight of the coating is preferably about 2 ounces per square yard or less and most preferably 1 ounce per square yard or less. The resultant base fabric is also substantially impermeable to air, when measured according to ASTM Test D737, "Air Permeability of Textile Fabrics".

As previously indicated, the substrate fabric is preferably a woven nylon material. In the most preferred embodiment, such substrate fabric will be formed from fibers of nylon 6,6. It has been found that such polyamide materials exhibit particularly good adhesion when used in combination with the coating according to the present invention.

PREFERRED EMBODIMENTS OF THE INVENTION

In order to further describe the present invention, the following nonlimiting examples are set forth. The examples are provided for the sole purpose of illustrating preferred embodiments of the invention and are not to be construed as limiting the scope of the invention in any manner.

EXAMPLE 1

A coating dispersion was prepared using the following constituents, wherein all proportions are by parts:

| Component | Proportion |
| --- | --- |
| Toluene | 392 parts |
| SilasticÔ HS-30 silicone rubber | 65 parts |
| Vamac DÔ copolymer | 35 parts |
| Alumina Trihydrate | 5 parts |
| Silane Z-6030Ô | 1 part |
| Inorganic Pigment | 1 part |
| Benzoyl Peroxide | 5 parts |
| Calcium Oxide filler | 5 parts |

This material was coated onto a 420 denier, nylon 6,6 fabric substrate, using a knife coater, dried for two minutes at 90° C., and cured for seven minutes at 170° C. The dry coating weight was 1.0 ounces per square yard. Air permeability measured at 124 Pa was essentially zero cfm per square foot of fabric (as tested in accordance with the ASTM D737 Method). The force required to remove a fixed number of yarns adjacent to a cut edge, tested in accordance with the method published by TRW Occupant Restraint Systems in TRW TP 9904 0180 (Comb Stripping Resistance), was 130 pounds.

EXAMPLE 2

A coating dispersion was prepared using the following constituents, wherein all proportions are by parts:

| Component | Proportion |
| --- | --- |
| Toluene | 392 parts |
| SilasticÔ HS-30 silicone rubber | 70 parts |
| Levapren 400Ô copolymer | 35 parts |
| Alumina Trihydrate | 5 parts |
| Silane Z-6030Ô | 1 part |
| Inorganic Pigment | 1 part |
| Benzoyl Peroxide | 5 parts |
| Calcium Oxide filler | 5 parts |

This material was coated onto a 420 denier, nylon 6,6 fabric substrate, using a knife coater, dried for two minutes at 90° C., and cured for seven minutes at 170° C. The dry coating weight was 1.0 ounces per square yard. Air permeability measured at 124 Pa was essentially zero cfm per square foot of fabric (as tested in accordance with the ASTM D737 Method). The force required to remove a fixed number of yarns adjacent to a cut edge, tested in accordance with the method published by TRW Occupant Restraint Systems in TRW TP 9904 0180 (Comb Stripping Resistance), was 94 pounds. Levapren 4000Ô is a copolymer, understood to contain 60 weight percent ethylene and 40 weight percent vinyl acetate. It was obtained from Bayer Fibers, Organics and Rubber Division, which is believed to have a place of business at Akron, Ohio.

EXAMPLE 3 (COMPARATIVE)

A typical silicone coating dispersion was prepared using the following constituents, wherein all proportions are by parts:

| Component | Proportion |
|---|---|
| Toluene | 336 parts |
| SilasticÔ HS-30 silicone rubber | 100 parts |
| Silane Z-6030Ô | 1 part |
| Inorganic Pigment | 1 part |
| Benzoyl Peroxide | 5 parts |
| Calcium Oxide filler | 5 parts |

This material was coated onto a 420 denier, nylon 6,6 fabric substrate, using a knife coater, dried for two minutes at 90° C., and cured for seven minutes at 170° C. The dry coating weight was 0.9 ounces per square yard. Air permeability measured at 124 Pa was essentially zero cfm per square foot of fabric (as tested in accordance with the ASTM D737 Method). The force required to remove a fixed number of yarns adjacent to a cut edge, tested in accordance with the method published by TRW Occupant Restraint Systems in TRW TP 9904 0180 (Comb Stripping Resistance), was 60 pounds. Clearly, the addition of the ethylene-containing copolymer provided a dramatic increase in strength to the fabric while not resulting in an appreciable loss in low air permeability.

There are, of course, many alternative embodiments and modifications of the present invention which are intended to be included within the spirit and scope of the following claims.

What is claimed is:

1. A fabric substrate coated with a coating composition comprising a polysiloxane cross-linked with an ethylene-containing copolymer.

2. The fabric substrate of claim 1 wherein said polysiloxane comprises at least one vinyl-functional group and is selected from the group consisting of vinyl-containing polyalkylsiloxane and vinyl-containing polyarylsiloxane and said ethylene-containing copolymer is selected from the group consisting of ethylene-methyl acrylate and ethylene-vinyl acetate.

3. The fabric substrate of claim 2 wherein said vinyl-containing polysiloxane is a vinyl-containing polyalkylsiloxane and said ethylene-containing copolymer is ethylene-methyl acrylate.

4. The fabric substrate of claim 3 wherein said vinyl-containing polyalkylsiloxane is vinyl-containing polydimethylsiloxane.

5. The fabric substrate of claim 2 wherein said polysiloxane is a vinyl-containing polyalkylsiloxane and said ethylene-containing copolymer is ethylene-vinyl acetate.

6. The fabric substrate of claim 5 wherein said polyalkylsiloxane is vinyl-containing polydimetbylsiloxane.

7. The fabric substrate of claim 2 wherein said coating composition comprises from about 50–95 parts by volume of the polysiloxane polymer and 5–50 parts by volume of the ethylene-containing copolymer.

8. The fabric substrate of claim 3 wherein said ethylene-methyl acrylate comprises from about 60–85 weight percent of ethylene and from about 15–40 weight percent of methyl acrylate.

9. The fabric substrate of claim 5 wherein said ethylene-vinyl acetate comprises from about 20–60 weight percent ethylene and from about 40–80 vinyl acetate.

10. An airbag fabric comprising the fabric substrate of claim 1.

11. An airbag fabric comprising the fabric substrate of claim 3.

12. An airbag fabric comprising the fabric substrate of claim 5.

13. A method of producing the fabric substrate of claim 2 comprising the steps of (a) admixing said polysiloxane, said ethylene-containing copolymer, optionally an organic silane, optionally components selected from the group consisting of fillers, pigments, processing aids, and mixtures thereof, a solvent, and a curing agent;

(b) applying the resultant admixture to the surface of a fabric substrate;

(c) heating said fabric substrate to a temperature sufficient to evaporate said solvent from the fabric substrate surface; and (d) heating the resultant treated fabric substrate to a temperature sufficient to effectuate cross-linking of the polysiloxane and ethylene-containing copolymer on the fabric substrate surface.

14. The method of claim 13 wherein said polysiloxane is polyalkylsiloxane;

said ethylene-containing copolymer is ethylene-methyl acrylate;

said curing agent is a peroxide;

said solvent is an organic volatile solvent;

said fabric substrate is an airbag fabric;

said heating temperature of step "c" is from about 60 to about 90° C.; and said heating temperature of step "d" is from about 150 to about 200° C.

15. The method of claim 13 wherein said polysiloxane is polyalkylsiloxane;

said ethylene-containing copolymer is ethylene-vinyl acetate;

said curing agent is a peroxide;

said solvent is an organic volatile solvent;

said fabric substrate is an airbag fabric;

said heating temperature of step "c" is from about 60 to about 90° C.; and said heating temperature of step "d" is from about 150 to about 200° C.

16. An airbag fabric comprising the fabric substrate produced in accordance with the method of claim 13.

17. An airbag fabric comprising the fabric substrate produced in accordance with the method of claim 14.

18. An airbag fabric comprising the fabric substrate produced in accordance with the method of claim 15.

* * * * *

UNITED STATES PATENT AND TRADEMARK OFFICE
CERTIFICATE OF CORRECTION

| | | |
|---|---|---|
| PATENT NO. | : 6,468,929 B2 | Page 1 of 1 |
| APPLICATION NO. | : 09/891927 | |
| DATED | : October 22, 2002 | |
| INVENTOR(S) | : Richard Henry Parker | |

It is certified that error appears in the above-identified patent and that said Letters Patent is hereby corrected as shown below:

In column 5, line 60, after the word "vinyl-containing", delete the word "polydimetbylsiloxane" and insert the word --polydimethylsiloxane--.

Signed and Sealed this

Seventeenth Day of July, 2007

JON W. DUDAS
*Director of the United States Patent and Trademark Office*